United States Patent [19]
Hansen

[11] 3,738,165
[45] June 12, 1973

[54] AIRCRAFT TAKEOFF ABORT INDICATOR

[76] Inventor: Raymond J. Hansen, P. O. Box 727, Sanger, Calif. 93657

[22] Filed: Feb. 7, 1972

[21] Appl. No.: 224,211

[52] U.S. Cl............................................. 73/178 T
[51] Int. Cl............................................ G01c 21/10
[58] Field of Search.............. 73/178 T; 116/129 R; 340/27 NA

[56] References Cited
UNITED STATES PATENTS

| | | | |
|---|---|---|---|
| 3,034,096 | 5/1962 | Craddock.......................... | 73/178 T |
| 3,504,335 | 3/1970 | Hall et al............................. | 73/178 |

*Primary Examiner*—Donald O. Woodiel
*Attorney*—Roger W. Erickson

[57] ABSTRACT

An apparatus for indicating to the pilot of an aircraft whether to abort a takeoff because of subnormal acceleration of the aircraft during the takeoff run. The apparatus includes: a chart of the normal takeoff acceleration versus takeoff time for the aircraft for a particular set of conditions; a warning indicator; and means adapted to scan the chart, and responsive to subnormal takeoff acceleration, for actuating the warning indicator. The chart is provided with a conductive area representing the subnormal takeoff acceleration versus takeoff time relationship for the aircraft and particular set of conditions, and the actuating means for the warning indicator includes a contact engageable with such conductive area. Each aircraft is provided with a set of charts covering different airports, different aircraft weights, different wind and barometric pressure conditions, and the like.

8 Claims, 6 Drawing Figures

PATENTED JUN 12 1973 3,738,165
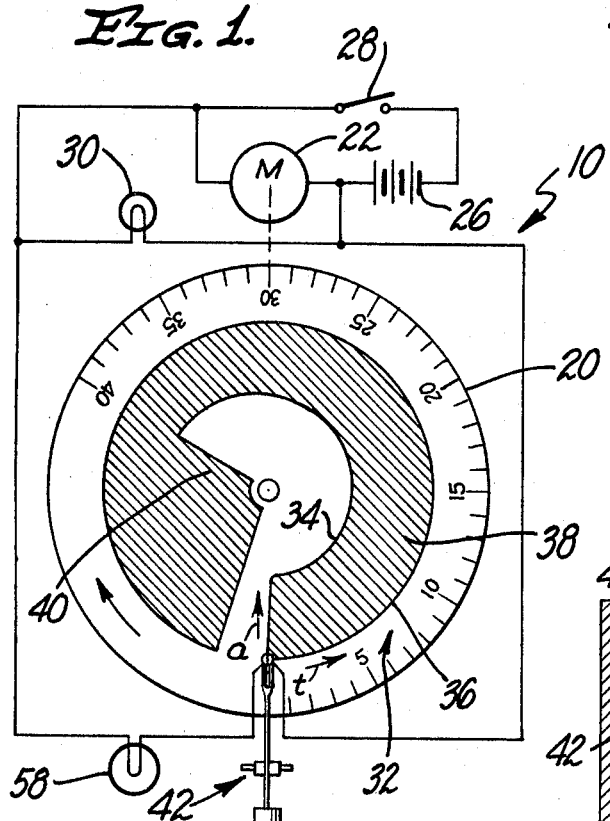
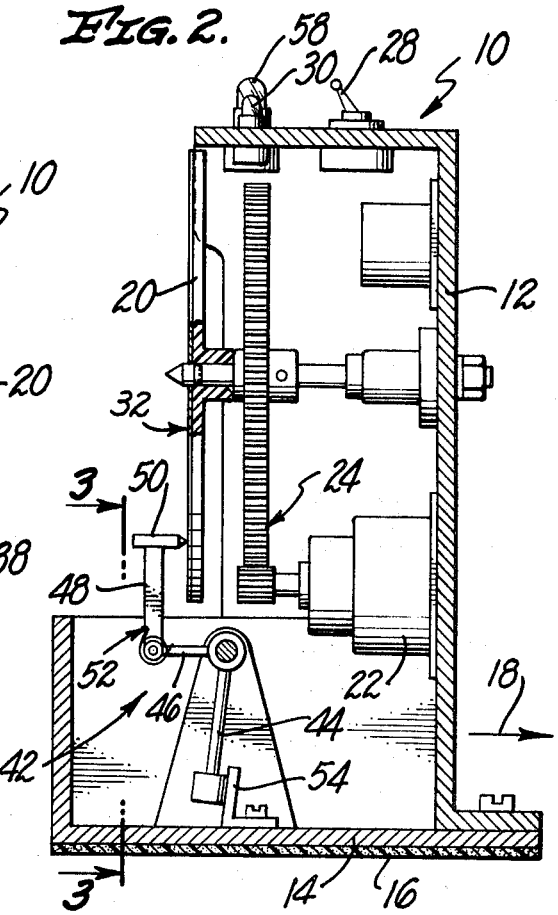
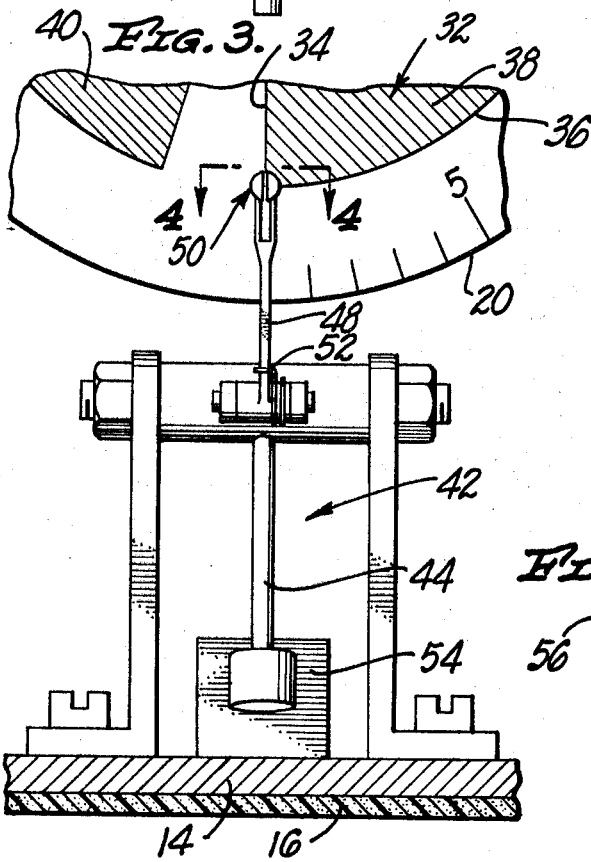
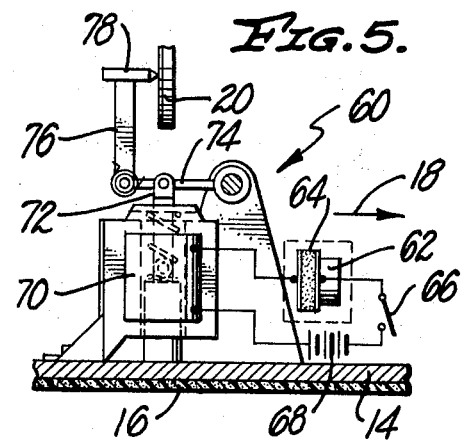
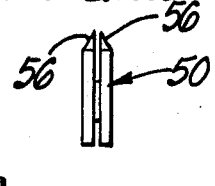
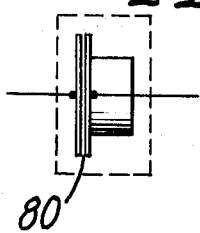

AIRCRAFT TAKEOFF ABORT INDICATOR

BACKGROUND OF INVENTION

The present invention relates in general to the problems involved in deciding when to abort the takeoff of an aircraft in the event that conditions precluding a safe takeoff develop and, more particularly, to an apparatus for indicating when to abort the takeoff.

As is well known, a safe takeoff requires the aircraft to achieve flying speed far enough from the end of the runway to enable the aircraft to clear any obstacles which may be present. For every takeoff, there is a so-called abort point. If for some reason the aircraft does not increase its airspeed as rapidly as it should between the start of the takeoff run and the abort point, the takeoff can be aborted safely at any point on the runway up to the abort point. If the decision to abort is delayed too long after the aircraft passes the abort point, it may not be possible to abort the takeoff safely.

Frequently, the pilot of the aircraft is required to make the decision whether to abort as the result of his own visual observations of the airspeed indicator of the aircraft and the position of the aircraft on the runway. This is undesirable for various reasons. For one thing, requiring the pilot to make the necessary visual observations distracts him from other duties he must perform during takeoff, and represents an intolerable additional burden in large commercial aircraft. Secondly, it is well known that airspeed indicators are often very inaccurate at low speeds, so that an airspeed indicator does not provide the pilot with a reliable guideline. Further, visual observations of the position of the aircraft on the runway cannot be made under conditions of poor visibility, such as those resulting from fog, rain, snow, and the like. Under such conditions, the pilot may have no real idea where he is on the runway.

In view of problems of the foregoing nature, various systems have been developed for indicating automatically whether to abort a takeoff, and when. Prior systems with which I am familiar rely on measuring either the airspeed of the airplane, or its ground speed. In either case, if the speed is not sufficiently high by the time the aircraft reaches the abort point for a particular set of conditions, the system actuates a warning indicator. Prior systems utilizing airspeed measurements tend to be unreliable because, as previously indicated, airspeed indicators are inherently inaccurate at low speeds. Further, such apparatuses require connections to the airspeed indicating system of the aircraft, or a separate airspeed indicating system. Prior apparatuses relying on the ground speed of the aircraft require a special ground-speed-sensing wheel, or a connection to one of the wheels of the aircraft itself. Consequently, apparatuses of this type are relatively complex.

SUMMARY AND OBJECTS OF INVENTION

The primary object of the invention is to provide an abort indicating system which avoids the foregoing and various other difficulties of other systems by relying solely on the acceleration of the aircraft during its takeoff run, and which activates a warning device or indicator if the takeoff acceleration is inadequate to achieve a speed high enough for a safe takeoff. In other words, the invention determines if the proper takeoff speed has been attained solely by measuring acceleration with respect to time.

More particularly, an important object of the invention is to provide an aircraft takeoff abort indicating system which includes: a chart of normal takeoff acceleration versus takeoff time for the aircraft under a particular set of conditions; a warning indicator; and means adapted to scan the chart, and responsive to subnormal takeoff acceleration of the aircraft, for actuating the warning indicator. A related object is to provide each aircraft with a set of interchangeable charts for different aircraft weights, different runways (which take car of variations in runway altitudes, runway slopes, and the like), different wind conditions, different barometric pressure conditions, and the like. Thus, the pilot merely selects the chart corresponding to, or most nearly corresponding to, the particular set of conditions with which he is faced for takeoff.

An important advantage of the foregoing is that the abort indicating system, relying only on aircraft acceleration during takeoff, can be a relatively simple, self-contained unit requiring no connections to external devices, such as airspeed indicators, ground speed sensors, or the like.

The invention may be summarized as including, and an important object is to provide an abort indicator which comprises: a chart carrier; a chart on the carrier of normal takeoff acceleration versus takeoff time for the aircraft for a specific set of conditions; carrier driving means for displacing the takeoff time scale on the chart past a reference point; an acceleration indicator at the reference point and adapted to indicate on the chart the actual takeoff acceleration of the aircraft versus takeoff time; acceleration responsive means responsive to the actual takeoff acceleration of the aircraft for actuating the acceleration indicator; a warning indicator; and actuating means adapted to scan the normal takeoff acceleration versus takeoff time relationship on the chart, and responsive to subnormal takeoff acceleration of the aircraft, for actuating the warning indicator.

Another object is to provide an abort indicator wherein the chart has a conductive area representing the subnormal takeoff acceleration versus takeoff time relationship for the particular aircraft and set of conditions, and wherein the actuating means for the warning indicator includes a contact engageable with the conductive area.

Yet another object is to provide on the chart another conductive area extending across the chart at a point on the time scale indicating the maximum permissible takeoff time without aborting, thereby providing an additinal safety factor.

Still another object is to provide an abort indicator wherein the carrier is a rotor and wherein the chart has a radial takeoff acceleration scale and a circumferential takeoff time scale.

The foregoing objects, advantages, features and results of the present invention, together with various other objects, advantages, features and results thereof which will be evident to those skilled in the art in the light of this disclosure, may be achieved with the exemplary embodiments of the invention illustrated in the accompanying drawing and described in detail hereinafter.

DESCRIPTION OF DRAWING

In the drawing:

FIG. 1 is a schematic front view of the abort indicator of the invention;

FIG. 2 is a vertical sectional view of one physical embodiment of the abort indicator;

FIG. 3 is an enlarged, fragmentary view taken as indicated by the arrowed line 3—3 of FIG. 2;

FIG. 4 is an elevational view taken as indicated by the arrowed line 4—4 of FIG. 3;

FIG. 5 is a view somewhat similar to FIG. 2, but showing an alternative embodiment; and FIG. 6 is another alternative embodiment.

DETAILED DESCRIPTION OF EXEMPLARY EMBODIMENTS OF INVENTION

In the drawing, the takeoff abort indicator of the invention is designated generally by the numeral 10 and is shown in FIGS. 2 and 3 as including a housing 12 having a base 14 covered on its lower side with a layer of friction material. With this construction, the abort indicator 10 may be used in any airplane simply by placing the housing 12 on a suitable substantially horizontal supporting surface. After takeoff, the unit can be stored in any suitable location in the airplane. This construction is particularly suitable for use in relatively small aircraft, especially private aircraft. For large commercial aircraft, the abort indicator 10 may be built into, or permanently installed on, a suitable instrument panel of the aircraft. In either event, the device is so oriented that the direction of takeoff acceleration of the aircraft is as indicated by the arrow 18 in FIG. 2.

The abort indicator 10 comprises a rotary chart carrier 20 driven by an electric motor 22 through a gear train 24. In the particular portable unit disclosed, the motor 22 is connected in series with a battery 26 through an on-off switch 28, an "on" light 30 also being connected in series with the switch and battery. In view of the fact that the portable unit shown is battery powered, means, not shown, may be provided for insuring that the rotary carrier 20 will always rotate at a constant speed.

The rotary carrier 20 is located at the rear of the housing 12 in a position readily visible to the pilot of the aircraft. Suitably mounted on the rear face of the rotary carrier 20, as by adhering it thereto with a pressure sensitive adhesive, is an interchangeable chart 32 having a radial acceleration scale $a$ and a circumferential time scale $t$. On the chart 32 is a line 34 which indicates normal takeoff acceleration versus takeoff time for the particular aircraft under a particular set of conditions, such as aircraft weight, airport runway, wind velocity and direction, barometric pressure, and the like. If desired, the line 34 may be established experimentally for the particular aircraft and set of conditions. Alternatively, a suitable set of charts may be made up from flight test data sufficient to establish the takeoff performance of the airplane throughout the expected range of operating conditions.

The chart 32 also is provided with a zero acceleration line 36 which, of course, is circular. The area 38 between the zero acceleration line 36 and the normal takeoff acceleration line 34 is electrically conductive. At the end of the normal acceleration line 34, the chart is provided with another electrically conductive area 40 which spans the radial acceleration scale.

Located at a predetermined reference point on the time scale of the chart 32 is an accelerometer 42 past which the time scale is driven during takeoff by the constant speed motor 22. It will be understood that the switch 28 is closed to energize the motor 22 at the start of takeoff, with the zero point on the time scale located opposite the accelerometer 42.

The accelerometer 42 is shown as comprising a pendulum 44 connected to an arm 46 having thereon a pivoted arm 48 carrying a pointer 50 engageable with the chart 32, and biased into engagement therewith by a spring 52. As will be apparent, during takeoff acceleration in the direction of the arrow 18, the pendulum 44 causes the pointer 50 to move radially inwardly of the chart 32, following the normal acceleration line 34 if the takeoff acceleration is normal. Preferably, under conditions of zero acceleration, the pendulum 44 is in an inclined position against a stop 54, as shown in FIG. 2. This insures against any movement of the pendulum 44 prior to the actual beginning of the takeoff run. However, the pendulum 44 may hang vertically under conditions of zero acceleration if desired.

The pointer 50, as best shown in FIG. 4, comprises electrical contacts 56 electrically insulated from each other and connected in series with the battery 26 through a warning indicator 58, which may be a warning light, as shown, a buzzer, or any other suitable indicator.

Considering the operation of the abort indicator 10, it is turned on at the moment the takeoff is started. In the particular construction illustrated, this is accomplished by closing the switch 28 manually. However, means, not shown, may be provided for starting the operation of the abort indicator 10 automatically in response to initiation of the takeoff run.

The accelerometer 42 responds to the takeoff acceleration experienced by the aircraft and, if the acceleration during the takeoff run is normal, the pointer 50 follows the normal acceleration line 34 as the chart 32 is rotated. If the acceleration is below normal, or drops below normal, for any reason, the electrically conductive area 38 bridges the contacts 56 to energize the warning indicator 58. Momentary energizations of the warning indicator 58 may not be of any significance and can be ignored by the pilot. However, if the warning indicator 58 is energized during the takeoff run for an appreciable length of time, the pilot should abort the takeoff.

The additional electrically conductive area 40 provides a safety factor which warns the pilot that the abort point has been reached on the basis of time alone, even though the acceleration has been normal. If for any reason the aircraft has not become airborne, or is not about to become airborne, when the electrically conductive area 40 reaches the pointer 50, the warning indicator 58 is energized to advise the pilot to abort immediately.

As will be apparent, the abort indicator 10 requires relatively little attention from the pilot during takeoff since it can be placed in a position wherein the warning indicator 58 is readily visible in the event that it is a light, as shown. Alternatively, or additionally, the warning indicator 58 may provide an audible warning, thereby requiring no visual attention from the pilot during takeoff.

In FIG. 5 of the drawing is shown an alternative accelerometer 60 which includes a mass 62 acting on a pressure sensitive resistor 64. The latter is connected through an on-off switch 66 and a battery 68 to a solenoid 70 having an armature 72 the position of which is determined by the acceleration controlled resistance in the resistor 64. The armature 72 is connected to an arm 74 which carries a spring loaded arm 76 and pointer 78 similar to the spring loaded arm 48 and pointer 50. The pointer 78, of course, engages the chart 32 on the rotary carrier 20 to indicate the magnitude of the actual takeoff acceleration at any instant.

FIG. 6 shows a similar accelerometer wherein a mass actuated condenser 80 is used in an accelerometer circuit similar to that of FIG. 5.

While the abort indicator 10 has been described solely in connection with aborting takeoffs, it will be understood that it can be used in connection with landings as well merely by turning it 180° so that it responds to negative acceleration (deceleration). Of course, charts of landing deceleration versus time must be substituted.

Although exemplary embodiments of the invention have been disclosed for purposes of illustration, it will be understood that various changes, modifications and substitutions may be incorporated in such embodiments without departing from the spirit of the invention as defined by the claims appearing hereinafter.

I claim as my invention:

1. In an aircraft takeoff abort indicator, the combination of:
   a. a chart carrier;
   b. a chart on said carrier of normal takeoff acceleration versus takeoff time for the aircraft;
   c. carrier driving means for displacing the takeoff time scale on said chart past a reference point;
   d. an acceleration indicator at said reference point and adapted to indicate on said chart the actual takeoff acceleration of the aircraft versus takeoff time; and
   f. acceleration responsive means responsive to the actual takeoff acceleration of the aircraft for actuating said acceleration indicator.

2. An abort indicator as defined in claim 1 including:
   a. a warning indicator; and
   b. actuating means adapted to scan the normal takeoff acceleration versus takeoff time relationship on the chart, and responsive to subnormal takeoff acceleration of the aircraft, for actuating said warning indicator.

3. An abort indicator as set forth in claim 2 wherein said chart has a conductive area representing the subnormal takeoff acceleration versus takeoff time relationship for the aircraft, and wherein said actuating means includes a contact engageable with said conductive area.

4. An abort indicator according to claim 3 including another conductive area on and extending across the chart at a point on the time scale indicating the maximum permissible takeoff time without aborting.

5. An abort indicator as defined in claim 4 wherein said carrier is a rotor and said chart has a radial takeoff acceleration scale and a circumferential takeoff time scale.

6. An abort indicator as defined in claim 2 wherein said carrier is a rotor and said chart has a radial takeoff acceleration scale and a circumferential takeoff time scale.

7. An abort indicator as defined in claim 2 which is a portable, self-contained unit.

8. In an aircraft takeoff indicator, the combination of:
   a. a chart of normal takeoff acceleration versus takeoff time for the aircraft; means for rotating said chart at a constant speed
   b. a warning indicator operatively connected to said chart; and
   c. acceleration responsive means adapted to scan said chart, and responsive to subnormal takeoff acceleration of the aircraft, for actuating said warning indicator.

* * * * *